(12) United States Patent
Yang

(10) Patent No.: US 12,130,194 B1
(45) Date of Patent: Oct. 29, 2024

(54) TORQUE DETECTION METHOD AND APPARATUS FOR ROBOT JOINT SERVO MOTOR, SERVO MOTOR, DEVICE, AND STORAGE MEDIUM

(71) Applicant: Hua Yang, Shanghai (CN)

(72) Inventor: Hua Yang, Shanghai (CN)

( * ) Notice: Subject to any disclaimer, the term of this patent is extended or adjusted under 35 U.S.C. 154(b) by 0 days.

(21) Appl. No.: 18/763,970

(22) Filed: Jul. 3, 2024

(30) Foreign Application Priority Data

May 27, 2024 (CN) .......................... 202410663466.3

(51) Int. Cl.
*G01L 3/10* (2006.01)
*B25J 13/08* (2006.01)
*G01L 5/00* (2006.01)

(52) U.S. Cl.
CPC ............. *G01L 3/105* (2013.01); *B25J 13/085* (2013.01); *G01L 5/0076* (2013.01)

(58) Field of Classification Search
CPC ....... G01L 3/105; G01L 5/0076; B25J 13/085
See application file for complete search history.

(56) References Cited

U.S. PATENT DOCUMENTS

| | | | | |
|---|---|---|---|---|
| 4,899,598 A | * | 2/1990 | Gumaste | G01L 3/103 73/DIG. 2 |
| 11,092,503 B2 | * | 8/2021 | Arimura | F16H 57/043 |

FOREIGN PATENT DOCUMENTS

| | | | | | |
|---|---|---|---|---|---|
| CN | 107628185 A | * | 1/2018 | | |
| CN | 111230885 A | | 6/2020 | | |
| CN | 212556654 U | * | 2/2021 | | |
| CN | 215136502 U | | 12/2021 | | |
| CN | 115070823 A | | 9/2022 | | |
| DE | 10001346 A1 | * | 12/2000 | ............... | B62D 6/10 |
| EP | 1193485 A2 | * | 4/2002 | ............. | G01L 3/102 |
| JP | H0623950 Y2 | * | 6/1994 | | |
| JP | H0788894 B2 | * | 9/1995 | | |
| JP | 2006046987 A | * | 2/2006 | | |
| JP | 2012073151 A | * | 4/2012 | | |
| JP | 5081353 B2 | * | 11/2012 | ............. | G01L 3/102 |
| JP | 7067297 B2 | * | 5/2022 | | |

\* cited by examiner

*Primary Examiner* — Octavia Hollington
(74) *Attorney, Agent, or Firm* — George D. Morgan (57) ABSTRACT

The present disclosure relates to a torque detection method and apparatus for a robot joint servo motor, a servo motor, a device, and a storage medium. The detection apparatus includes: a controller, an amorphous strip detection strip provided on the output shaft, and an excitation coil and an induction coil provided on the hollow cylindrical support; the method includes: the amorphous strip detection strip generating a magnetic induction intensity change according to a torque change of the output shaft, where the magnetic induction intensity change is used for the excitation coil to generate a changing magnetic field; the changing magnetic field is used for the induction coil to generate a changing current; the changing current is used for the controller to acquire a value of the torque. The present disclosure may detect the torque of the servo motor with high accuracy.

16 Claims, 9 Drawing Sheets

TORQUE DETECTION METHOD AND APPARATUS FOR ROBOT JOINT SERVO MOTOR, SERVO MOTOR, DEVICE, AND STORAGE MEDIUM

CROSS-REFERENCE TO RELATED APPLICATIONS

The application claims priority to Chinese patent application No. 2024106634663, filed on May 27, 2024, the entire contents of which are incorporated herein by reference.

TECHNICAL FIELD

The present disclosure relates to the field of detection, and particularly to a torque detection method and apparatus for a robot joint servo motor, a servo motor, a device, and a storage medium.

BACKGROUND

With the development of industrial technology, robots have been widely used in industrial production, exploration, medical services, and other fields. In order to complete more complex work, robots used in industrial production, exploration, and other fields need to have movable mechanical arms, and the degrees of freedom of the mechanical arms are achieved through robot joints.

The robot joint is usually controlled by a servo motor. The servo motor refers to an engine that controls the operation of mechanical elements in a servo system, and is an auxiliary apparatus for indirectly varying the speed of a motor. In order to better control small movements of the robot joint, it is necessary to accurately detect a torque of the servo motor. Detecting the torque of the robot joint servo motor is to detect a torque of a harmonic reducer in the servo motor. The accuracy of torque detection not only affects the motion performance of the robot, but also relates to whether the robot can correctly perform a task.

The torque detection method in the related art uses a giant magnetostrictive material coating to detect a torque. Since the giant magnetostrictive material coating needs to be directly sprayed on an output shaft and cannot be prefabricated, the use thereof is not convenient, and the cost is high. Furthermore, the on-site spraying of the giant magnetostrictive material coating is uneven in the spraying process, and the giant magnetostrictive material coating is sensitive to temperature and magnetic fields, resulting in high requirements for the operating environment. Moreover, the servo motor itself generates heat, leading to lower detection accuracy. In addition, the giant magnetostrictive material coating needs positive and negative coatings, making the subsequent matching components complex, and further raising the cost.

It can be seen that the torque detection method in the related art has a complex structure, a low accuracy, and a high cost.

SUMMARY

In order to solve the above-mentioned technical problem or at least partially solve the above-mentioned technical problem, the present disclosure provides a torque detection method and apparatus for a robot joint servo motor, a servo motor, a device, and a storage medium.

In a first aspect, the present disclosure provides a torque detection method for a robot joint servo motor, where the servo motor includes a harmonic reducer and a detection apparatus; the harmonic reducer includes an output shaft and a hollow cylindrical support, and the output shaft is provided inside the hollow cylindrical support;

the detection apparatus includes: a controller, an amorphous strip detection strip provided on the output shaft, and an excitation coil and an induction coil provided on the hollow cylindrical support;

the method includes:

the amorphous strip detection strip generating a magnetic induction intensity change according to a torque change of the output shaft, where the magnetic induction intensity change is used for the excitation coil to generate a changing magnetic field;

the changing magnetic field is used for the induction coil to generate a changing current;

the changing current is used for the controller to acquire a value of the torque.

Optionally, the amorphous strip detection strip is adhered to the output shaft of the harmonic reducer and surrounds the output shaft in a circle.

Optionally, the amorphous strip detection strip includes notches configured to amplify the magnetic induction intensity change.

Optionally, any plane passing through an axis of the output shaft is taken as a projection plane, the axis of the output shaft is taken as an X-axis, and a line perpendicular to the X-axis in the projection plane is taken as a Y-axis;

the amorphous strip detection strip includes a first pattern and a second pattern; the first pattern includes a plurality of first notches, and the second pattern includes a plurality of second notches;

a projection of the first notch on the projection plane is a first projection, and a plurality of first projections are parallel;

an angle of an included angle between each of the first projections and the X-axis is a first angle, and a plurality of first angles are equal;

a projection of the second notch on the projection plane is a second projection, and a plurality of second projections are parallel;

an angle of an included angle between each of the second projections and the X-axis is a second angle, and a plurality of second angles are equal, where the first angle is not equal to the second angle.

Optionally, the output shaft includes a first end;

a first length is a distance between a projection point of any point on any one of the first notches on the projection plane and the first end;

a second length is a distance between a projection point of any point on any one of the second notches on the projection plane and the first end, where the first length is less than the second length.

Optionally, a sum of the first angle and the second angle is 180 degrees.

Optionally, the first angle is 45 degrees, or the second angle is 45 degrees.

Optionally, an angle of an included angle between a stress direction of the output shaft and the X-axis is a stress angle;

the first angle is equal to the stress angle; or the second angle is equal to the stress angle.

Optionally, the excitation coil and/or the induction coil are wound around an outer wall of the hollow cylindrical support; or the excitation coil and/or the induction coil are provided on an inner wall of the hollow cylindrical support.

Optionally, the induction coil and the excitation coil are wound alternately; or the induction coil and the excitation coil are wound separately; or the induction coil is wound outside the excitation coil; or the excitation coil is wound outside the induction coil.

Optionally, the controller includes a signal detection circuit, a signal amplification circuit, a filter circuit, and a signal processing circuit;

before the amorphous strip detection strip generating a magnetic induction intensity change according to a torque change of the output shaft, the method further includes:

the signal detection circuit generating a high-frequency excitation electrical signal and transmitting the high-frequency excitation electrical signal to the excitation coil;

the changing current being used for the controller to acquire a value of the torque includes:

the signal detection circuit receiving the changing current outputted by the induction coil;

the signal amplification circuit amplifying the changing current and outputting an amplified changing current;

the filter circuit filtering out clutters in the amplified changing current and outputting a filtered changing current; and the signal processing circuit acquiring the value of the torque according to the filtered changing current.

Optionally, the signal processing circuit acquiring the value of the torque according to the filtered changing current includes:

the signal processing circuit acquiring a first current at a first moment;

the signal processing circuit acquiring a second current at a second moment;

the signal processing circuit acquiring a difference between the first current and the second current; and the signal processing circuit acquiring the value of the torque from the first moment to the second moment according to the difference and a parameter of the amorphous strip detection strip.

In a second aspect, the present disclosure provides a torque detection apparatus for a robot joint servo motor, where the detection apparatus is applied to a harmonic reducer of the servo motor; the harmonic reducer includes an output shaft and a hollow cylindrical support, and the output shaft is provided inside the hollow cylindrical support; the detection apparatus includes:

an amorphous strip detection strip provided on the output shaft and configured to generate a magnetic induction intensity change according to a torque change of the output shaft;

an excitation coil provided on the hollow cylindrical support and configured to generate a changing magnetic field according to the magnetic induction intensity change;

an induction coil provided on the hollow cylindrical support and configured to convert the changing magnetic field into a changing current; and a controller configured to acquire a value of the torque according to the changing current.

In a third aspect, the present disclosure provides a robot joint servo motor, applied to the above-mentioned torque detection method for a robot joint servo motor.

In a fourth aspect, the present disclosure provides a computer device, including a memory, a processor, and a computer program stored on the memory and capable of running on the processor; the processor, when executing the computer program, implements the method of any one of the above.

In a fifth aspect, the present disclosure provides a computer-readable storage medium having stored thereon a computer program; the computer program, when executed by a processor, implements the method of any one of the above.

The present disclosure provides a torque detection method and apparatus for a robot joint servo motor, a servo motor, a device, and a storage medium. The output shaft is provided with the amorphous strip detection strip. The method includes: the amorphous strip detection strip generating the magnetic induction intensity change according to the torque change of the output shaft, where the magnetic induction intensity change is used for the excitation coil to generate the changing magnetic field; the changing magnetic field is used for the induction coil to generate the changing current; the changing current is used for the controller to acquire the value of the torque. In an embodiment of the present disclosure, the amorphous strip detection strip is adhered to the output shaft of the harmonic reducer, and when a torque is generated on the output shaft of the harmonic reducer, the magnetic induction intensity of the amorphous strip will change. The excitation coil is wound on the hollow cylindrical support, and the output shaft is provided inside the hollow cylindrical support. The amorphous strip detection strip is adhered to the output shaft, which is equivalent to the amorphous strip detection strip being provided inside the excitation coil. In this case, the amorphous strip detection strip is equivalent to a magnetic core. A torque is generated on the output shaft, and the magnetic induction intensity of the amorphous strip detection strip changes, which is equivalent to the magnetic induction intensity of the magnetic core in the excitation coil changing. Accordingly, the magnetic field generated by the excitation coil also changes. The induction coil may generate the changing current according to the changing magnetic field in the excitation coil, and the value of the torque on the output shaft may be acquired by detecting the changing current. According to the method of the embodiment of the present disclosure, the amorphous strip detection strip is adhered to the output shaft so that the amount of torque on the output shaft may detected, and the amorphous strip is sensitive to the torque. Thus, the method of the embodiment of the present disclosure has high accuracy. In addition, the amorphous strip is less sensitive to temperature and maintains relatively high accuracy for applications where the servo motor generates heat during operation.

BRIEF DESCRIPTION OF DRAWINGS

The accompanying drawings herein, which are incorporated into and form a part of the specification, illustrate embodiments in accordance with the present disclosure and are used in conjunction with the specification to explain the principles of the present disclosure.

In order to explain the embodiments of the present disclosure or the technical solutions in the related art more clearly, the accompanying drawings to be used in the description of the embodiments or related art will be briefly described below. Obviously, for a person skilled in the art, other drawings may also be obtained according to these drawings without involving any inventive effort.

In the drawings, 1-amorphous strip detection strip; 2-excitation coil; 3-controller; 4-servo motor; 5-harmonic reducer; 7-induction coil; 8-output shaft; and 9-hollow cylindrical support.

DETAILED DESCRIPTION OF THE EMBODIMENTS

In order to make the purpose, technical solutions, and advantages of the embodiments of the present disclosure clearer, the technical solutions in the embodiments of the present disclosure will be clearly and completely described below in conjunction with the drawings in the embodiments of the present disclosure. Obviously, the described embodiments are some embodiments of the present disclosure, not all embodiments. Based on the embodiments of the present disclosure, all other embodiments obtained by a person skilled in the art without inventive effort fall within the scope of the present disclosure.

Figure 1:
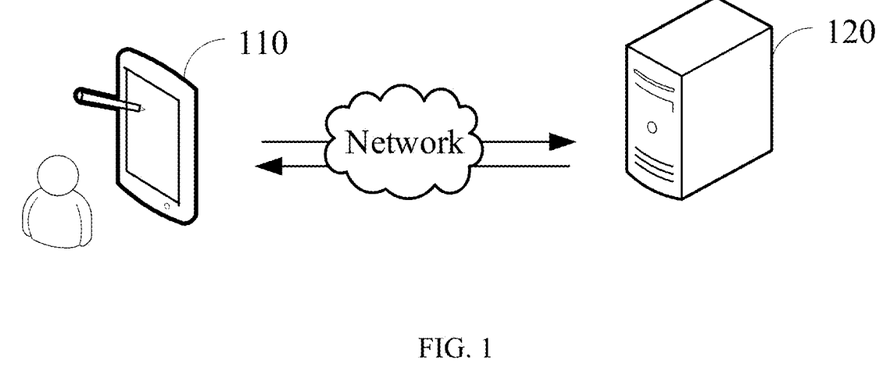
FIG. 1 is a diagram of an application environment of a torque detection method for a robot joint servo motor according to an embodiment of the present disclosure.

FIG. 1 is a diagram of an application environment of a torque detection method for a robot joint servo motor according to an embodiment of the present disclosure. Referring to FIG. 1, the torque detection method for a robot joint servo motor is applied to a torque detection system for a robot joint servo motor, to a robot joint control system, or to a torque detection apparatus for a robot joint servo motor. The above-mentioned detection system, control system, detection apparatus, or robot includes a terminal 110 and/or a server 120. The terminal 110 and the server 120 are connected through a network. The terminal 110 may specifically be a desktop terminal and a mobile terminal and may also be an integrated chip, a processing chip, etc., which are self-contained or external to the robot. The mobile terminal may specifically be at least one of a mobile phone, a tablet computer, a notebook computer, and an integrated chip and a processing chip, which are self-contained or external to the robot. The server 120 may be implemented as a stand-alone server or as a server cluster including a plurality of servers.

The torque detection method for a robot joint servo motor of the present disclosure is applied to the terminal 110 and/or the server 120.

Figure 2:
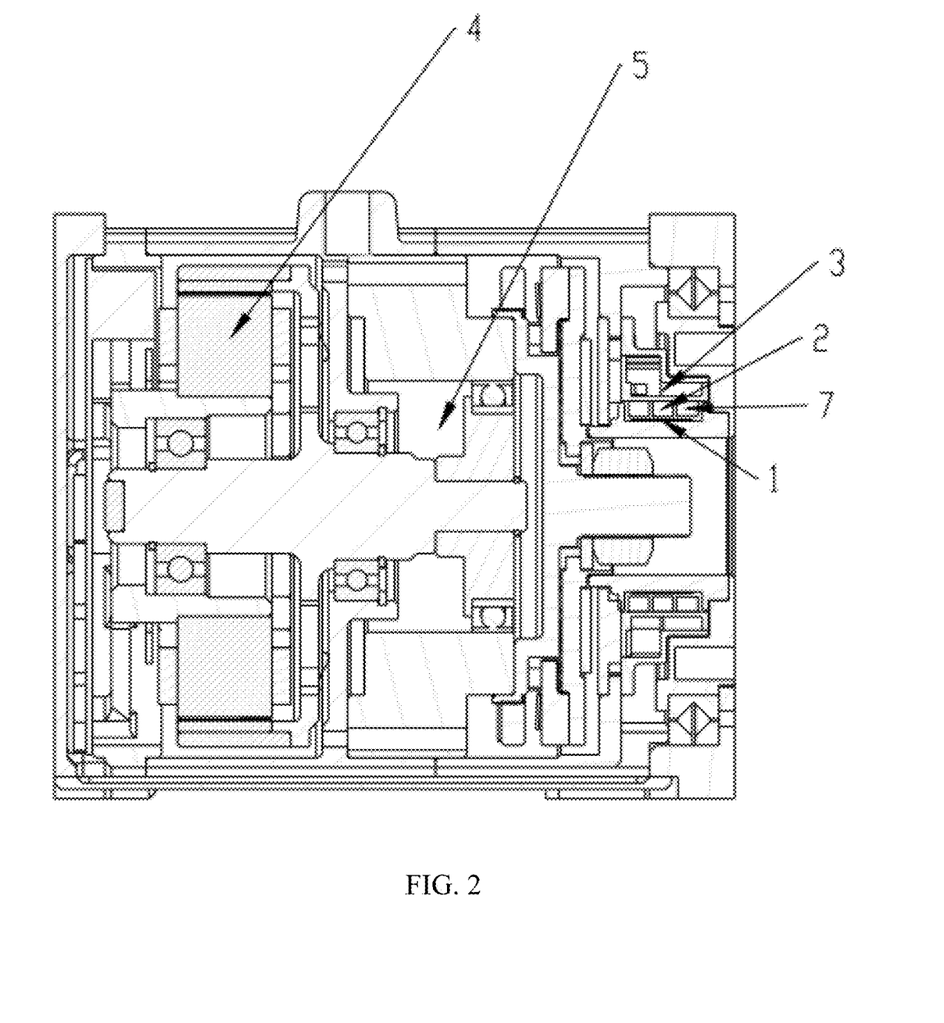
FIG. 2 is a schematic diagram of a robot joint drive device according to an embodiment of the present disclosure.
Figure 3:
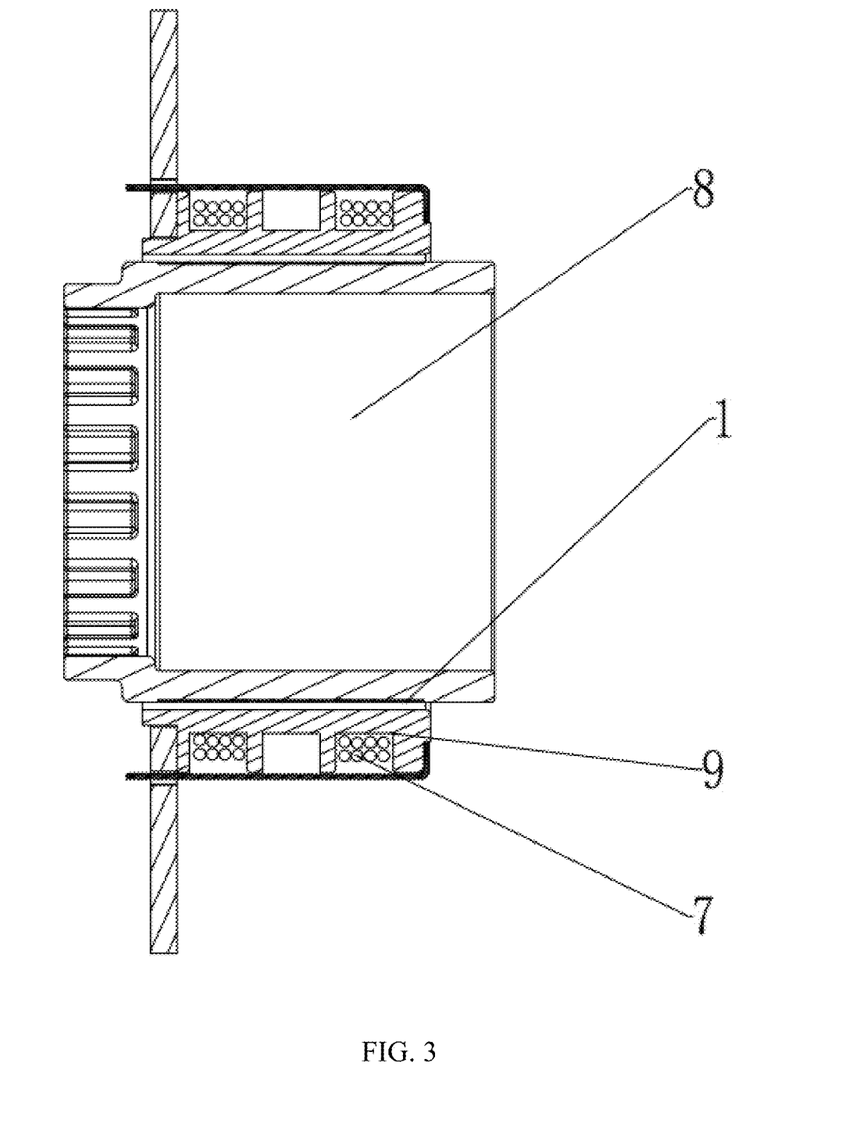
FIG. 3 is a schematic diagram of a robot joint drive device according to an embodiment of the present disclosure.

FIGS. 2 and 3 show schematic diagrams of robot joint drive devices which may be used to drive robot joints.

As shown in FIGS. 2 and 3, the joint drive device includes a servo motor 4. The servo motor 4 includes a harmonic reducer 5, and the harmonic reducer 5 includes an output shaft 8 and a hollow cylindrical support 9. The output shaft 8 is provided inside the hollow cylindrical support 9.

The detection apparatus includes: an amorphous strip detection strip 1 provided on the output shaft 8, and an excitation coil 2 and an induction coil 7 provided on the hollow cylindrical support 9.

In the embodiment of the present disclosure, the robot joint servo motor 4 drives the movement of the robot joint through the harmonic reducer 5 so that a torque of the robot joint servo motor 4 actually refers to a torque of the harmonic reducer 5, and the torque of the harmonic reducer 5 refers to a torque on the output shaft 8, thus obtaining the torque of the output shaft 8 is equivalent to obtaining the torque of the robot joint servo motor 4.

Figure 4:
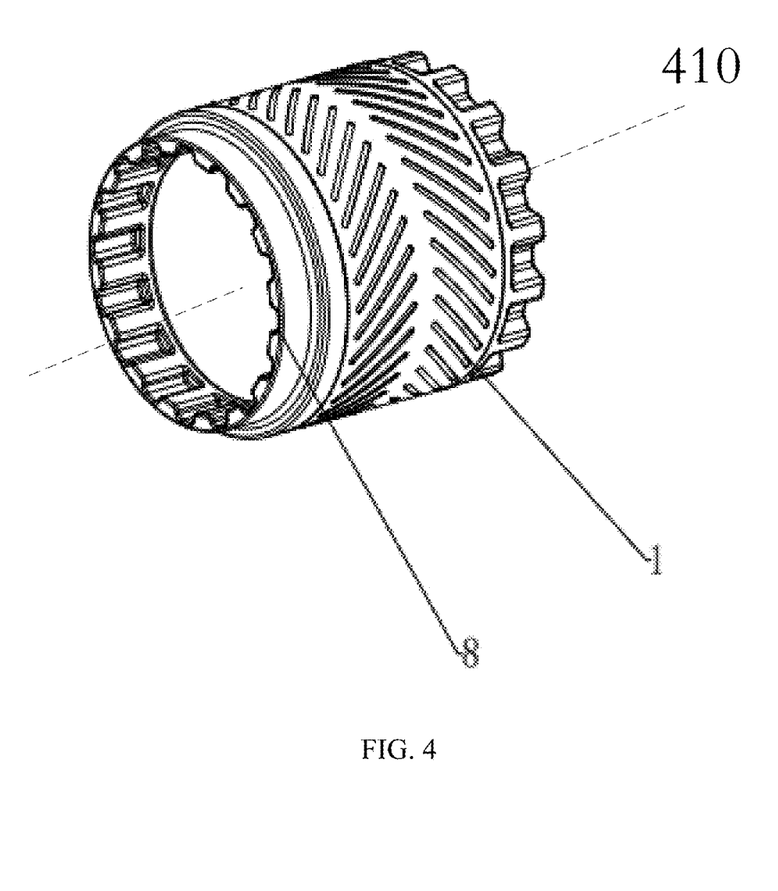
FIG. 4 is a schematic diagram of an output shaft and an amorphous strip detection strip according to an embodiment of the present disclosure.

FIG. 4 is a schematic diagram of an output shaft 8 and an amorphous strip detection strip 1 according to an embodiment of the present disclosure. As shown in FIG. 4, the amorphous strip detection strip 1 is adhered to the output shaft 8 of the harmonic reducer 5 and surrounds the output shaft 8 in a circle.

The amorphous strip detection strip 1 is made of an amorphous strip material. The amorphous strip material is an amorphous material composed of metal alloys and is much lower in crystallinity than crystalline materials. The amorphous strip material has an excellent soft magnetic property, a high magnetic permeability, and a low hysteresis loop.

In the embodiment of the present disclosure, the amorphous strip detection strip 1 may also be referred to as a torque sensor, an amorphous strip sensor, or the like.

The amorphous strip detection strip 1 made of the amorphous strip material uses a magnetic induction principle, and when a torque is applied to the amorphous strip detection strip 1, the magnetic induction intensity in the amorphous strip material changes, and this change may be used to indirectly measure the amount of torque applied to the amorphous strip detection strip 1.

A relationship between a magnetic induction intensity change and a torque change of the amorphous strip detection strip 1 is briefly described below.

It is assumed that the amorphous strip material has a magnetic permeability of $\mu$, a cross-sectional area of A, a magnetization intensity of H, and a magnetic induction intensity of B. The torque applied to the amorphous strip is M.

The amorphous strip has a length of $\alpha$, a width of b, and a height of c. The height is also referred to as thickness. Since the amorphous strip detection strip 1 surrounds the output shaft 8 in a circle, the length of the amorphous strip detection strip 1 is approximately equal to an outer circumference of the output shaft 8. The cross-sectional area of the amorphous strip is $A=\alpha*b$.

According to the Ampere circuital theorem, a relationship between the magnetic induction intensity B and the magnetization intensity H may be expressed as: $B=\mu*H$.

According to the distribution of the magnetic induction intensity B in the amorphous strip material, the following equation may be established: $B=B0+\Delta B$, where B0 is a reference magnetic induction intensity without an external torque, and $\Delta B$ is a magnetic induction intensity change caused by the torque.

It is assumed that a magnetization intensity change of the amorphous strip material under the action of the torque is $\Delta H$, and according to a relationship between the magnetic permeability $\mu$ and the magnetization intensity H of the amorphous strip material, there is:

$$\Delta H = \mu * \Delta B.$$

A relationship between the torque M and the magnetization intensity change ΔH may be expressed as:

$$M = \mu * B * A = \mu * (B0 + \Delta B) * A.$$

An expansion equation is:

$$M = \mu * B0 * A + \mu * \Delta B * A.$$

Since ΔB is the magnetic induction intensity change caused by the torque, ΔB*A may be expressed as an amount of change in the magnetic induction intensity caused by the torque. That is:

$$\Delta B * A = \Delta M,$$

where ΔM represents the amount of change in the magnetic induction intensity caused by the torque. In the embodiment of the present disclosure, ΔM may be calculated from a detection amount.

According to the above-mentioned derivation process, the amount of torque M applied to the output shaft 8 may be derived by measuring the amount of change ΔM in the magnetic induction intensity caused by the amorphous strip detection strip 1 under the action of the torque generated by the output shaft 8. The amount of change in the magnetic induction intensity may be obtained by detecting a changing current.

In the embodiment of the present disclosure, the amorphous strip detection strip 1 is adhered to the output shaft 8 of the harmonic reducer 5 and surrounds the output shaft 8 in a circle, and when a torque is generated on the output shaft 8 of the harmonic reducer 5, the magnetic induction intensity of the amorphous strip will change. The excitation coil 2 is wound on the hollow cylindrical support 9, and the output shaft 8 is provided inside the hollow cylindrical support 9. The amorphous strip detection strip is adhered to the output shaft 8, which is equivalent to the amorphous strip detection strip 1 being provided inside the excitation coil 2. In this case, the amorphous strip detection strip 1 is equivalent to a magnetic core. A torque is generated on the output shaft 8, and the magnetic induction intensity of the amorphous strip detection strip 1 changes, which is equivalent to the magnetic induction intensity of the magnetic core in the excitation coil 2 changing. Accordingly, the magnetic field generated by the excitation coil 2 also changes. The induction coil 7 may generate the changing current according to the changing magnetic field in the excitation coil 2, and the value of the torque on the output shaft 8 may be acquired by detecting the changing current.

According to the method of the embodiment of the present disclosure, the amorphous strip detection strip 1 is adhered to the output shaft 8 so that the amount of torque on the output shaft 8 may detected, and the amorphous strip is sensitive to the torque. Thus, the method of the embodiment of the present disclosure has high accuracy. In addition, the amorphous strip is less sensitive to temperature and maintains relatively high accuracy for applications where the servo motor 4 generates heat during operation.

In the embodiment of the present disclosure, only one amorphous strip detection strip 1 is needed to detect the torque so that only one excitation coil 2 and one induction coil 7 used together with the amorphous strip detection strip 1 are needed. Therefore, the torque detection apparatus of the embodiment of the present disclosure has a simple structure and a low cost.

In addition, the amorphous strip detection strip 1 is made of the amorphous ribbon material, and the amorphous strip material is typically subjected to rapid solidification techniques such as rapid cooling or sputtering to obtain an amorphous structure. The amorphous strip detection strip may also be prepared in various shapes and sizes through wire drawing, rolling, etc. Therefore, the amorphous strip detection strip in the embodiment of the present disclosure may be prepared in advance in a professional production occasion and then adhered to the output shaft 8. Preparing in advance in a professional production occasion rather than processing in a non-professional production occasion may ensure the process consistency and yield of the amorphous strip detection strip 1, which is beneficial to improve the detection accuracy and reduce the difficulty of adjustment and measurement in use. The amorphous strip detection strip is prepared in advance and then adhered to the output shaft 8 so that the operation is simple and the requirement for an operator is low. In addition, since the amorphous strip detection strip 1 is not sensitive to the temperature, the requirement for a mounting occasion for mounting the amorphous strip detection strip 1 on the servo motor 4 is not high, and the cost may be further reduced.

Figure 5:
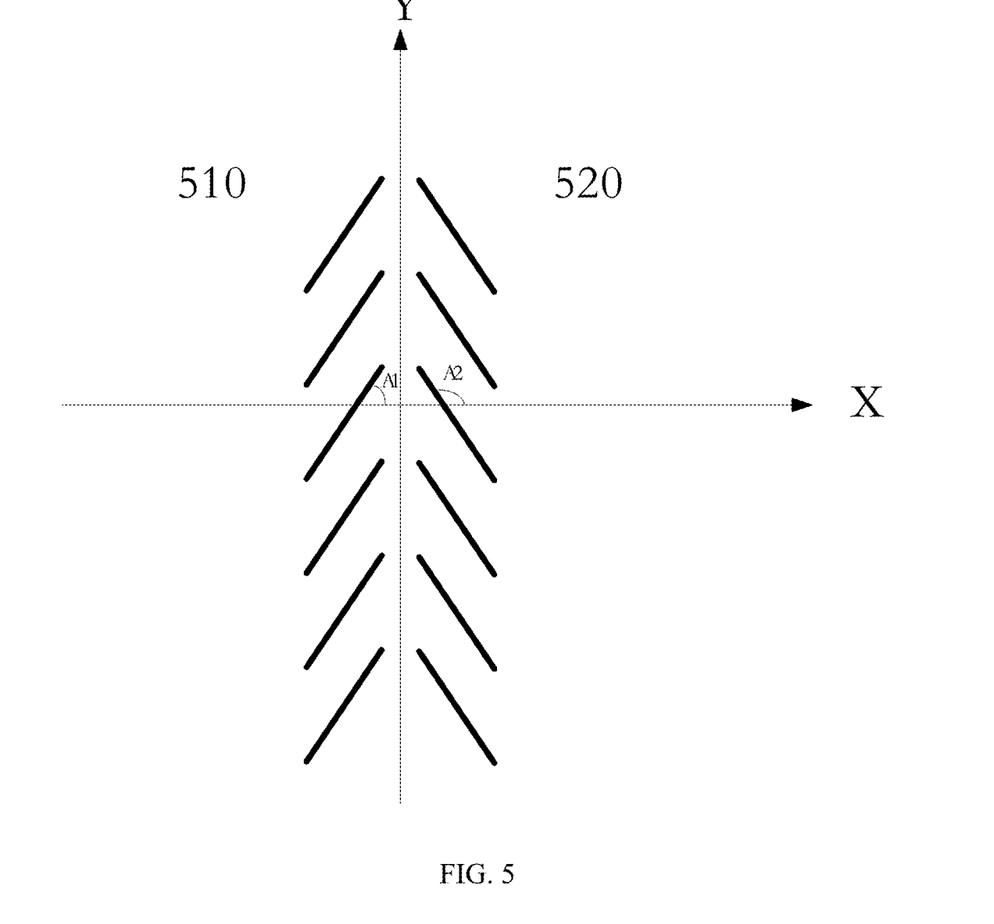
FIG. 5 is a schematic diagram of a projection of an amorphous strip detection strip on a projection plane according to an embodiment of the present disclosure.

Referring to FIGS. 4 and 5, the amorphous strip detection strip 1 includes notches configured to amplify the magnetic induction intensity change.

As shown in FIG. 4, the output shaft 8 is generally cylindrical. An axis of the output shaft 8 is a line connecting centers of two bottom surfaces of the output shaft 8 and is shown as 410 in FIG. 4.

In the embodiment of the present disclosure, any plane passing through the axis of the output shaft 8 is taken as a projection plane, the axis of the output shaft 8 is taken as an X-axis, and a line perpendicular to the X-axis in the projection plane is taken as a Y-axis.

The amorphous strip detection strip 1 includes a first pattern and a second pattern. The first pattern includes a plurality of first notches, and the second pattern includes a plurality of second notches.

A projection of the first notch on the projection plane is a first projection, and a plurality of first projections are parallel.

An angle of an included angle between each of the first projections and the X-axis is a first angle, and a plurality of first angles are equal.

A projection of the second notch on the projection plane is a second projection, and a plurality of second projections are parallel.

An angle of an included angle between each of the second projections and the X-axis is a second angle, and a plurality of second angles are equal.

The first angle is not equal to the second angle.

FIG. 5 is a schematic diagram of a projection of the amorphous strip detection strip 1 on the projection plane.

In the embodiment of the present disclosure, an XY coordinate system is a right-handed coordinate system. As shown in FIG. 5, the first angle and the second angle are both greater than or equal to 0 degrees and less than 360 degrees.

In other embodiments of the present disclosure, if the coordinate system is provided differently, the first angle and the second angle may also be other degrees and will not be repeated here.

In the embodiment of the present disclosure, it is assumed that the axis of the output shaft 8 is parallel to a horizontal plane, the horizontal plane may be used as the projection plane for the convenience of illustration, and the XY coordinate system is established in the horizontal plane. As shown in FIG. 5, the first notch on the amorphous strip detection strip 1 corresponds to a first projection 510, and the second notch corresponds to a second projection 520.

The first projections 510 are a set of parallel lines, and similarly the second projections 520 are a set of parallel lines.

Since the first projections 510 are a set of parallel lines, the included angle between each of the parallel lines and the X-axis is the same. The included angle between the first projection and the X-axis is denoted as A1, and an angle of A1 is a first angle a1. A plurality of first angles a1 are equal.

Similarly, the included angle between the second projection and the X-axis is denoted as A2, and an angle of A2 is a second angle a2. A plurality of second angles a2 are equal.

In the embodiment of the present disclosure, the first angle a1 is not equal to the second angle a2.

In the embodiment of the present disclosure, a sum of one first angle a1 and one second angle a2 is 180 degrees, i.e., a1+a2=180 degrees.

In the embodiment of the present disclosure, the amorphous strip detection strip 1 includes the notches configured to amplify the magnetic induction intensity change.

In the embodiment of the present disclosure, an angle of an included angle between a stress direction of the output shaft 8 and the X-axis is a stress angle.

The first angle is equal to the stress angle, or the second angle is equal to the stress angle.

In the embodiment of the present disclosure, the output shaft 8 of the servo motor 4 may rotate in forward and reverse directions so that with respect to the XY coordinate axis, the stress angle is 45 degrees when rotating in one direction and 135 degrees when rotating in the other direction.

In the embodiment of the present disclosure, there are two sets of notches corresponding to two sets of projections, i.e., the first projections 510 corresponding to the first notches and the second projections 520 corresponding to the second notches as shown in FIG. 5. The first angle a1 corresponding to the first projection 510 is 45 degrees, and in this case, the second angle a2 corresponding to the second projection 520 is 135 degrees; or the second angle a2 corresponding to the second projection 520 is 45 degrees, and in this case, the first angle a1 corresponding to the first projection 510 is 135 degrees.

Two sets of notches are provided, and one of the first angle a1 and the second angle a2 is 45 degrees and the other is 135 degrees so that when the servo motor 4 rotates in the forward direction or the reverse direction, the stress angle is equal to one of the first angle a1 and the second angle a2, which is equivalent to a notch direction being the same as the stress direction. When the notch direction of the amorphous strip detection strip 1 is the same as the stress direction, the magnetic induction intensity change may be amplified so that the detection of the torque is more sensitive, accurate, and precise.

In other embodiments of the present disclosure, if the influence of other influencing factors on the stress direction is taken into account, the first angle a1 and the second angle a2 may be other degrees and will not be repeated here, but the effect of setting the first angle a1 and the second angle a2 is still to amplify the stress of the output shaft 8.

In the embodiment of the present disclosure, the output shaft 8 includes a first end.

A first length is a distance between a projection point of any point on any one of the first notches on the projection plane and the first end.

A second length is a distance between a projection point of any point on any one of the second notches on the projection plane and the first end.

The first length is less than the second length.

As shown in FIG. 5, the projection point of any point on any first notch on the projection plane is actually any point on the first projection corresponding to any first notch. The projection point of any point on any second notch on the projection plane is actually any point on the second projection corresponding to any second notch.

As shown in FIG. 5, if the Y-axis is located between the first projections 510 and the second projections 520, the first length and the second length actually indicate that the first projections 510 are in a second quadrant and a fourth quadrant, and the second projections 520 is in a first quadrant and a fourth quadrant.

In the embodiment of the present disclosure, the output shaft 8 includes two bottom surfaces, i.e., two ends, which may be referred to as the first end and a second end, respectively. The first end and the second end are provided for ease of description only, and it is not intended that one end of the output shaft 8 must be the first end.

The first notch and the second notch are not substantially different and are distinguished in the embodiment of the present disclosure only for ease of description. In the embodiment of the present disclosure as shown in FIG. 5, the first projections 510 corresponding to the first notches are in the second quadrant and the fourth quadrant. In other embodiments of the present disclosure, the first projections 510 corresponding to the first notches may be in the first quadrant and the fourth quadrant and will not be repeated here.

In other embodiments of the present disclosure, the directions of the first notch and the second notch may also be described according to an intersecting line of an extension line of the first projection 510 and an extension line of the second projection 520. As shown in FIG. 5, the extension line of the first projection 510 and the extension line of the second projection 520 intersect, and a line connecting a plurality of intersections is parallel to the Y-axis. In other embodiments of the present disclosure, the extension line of the first projection 510 and the extension line of the second projection 520 intersect, and the line connecting the plurality of intersections may be set as the Y-axis.

Figure 6:
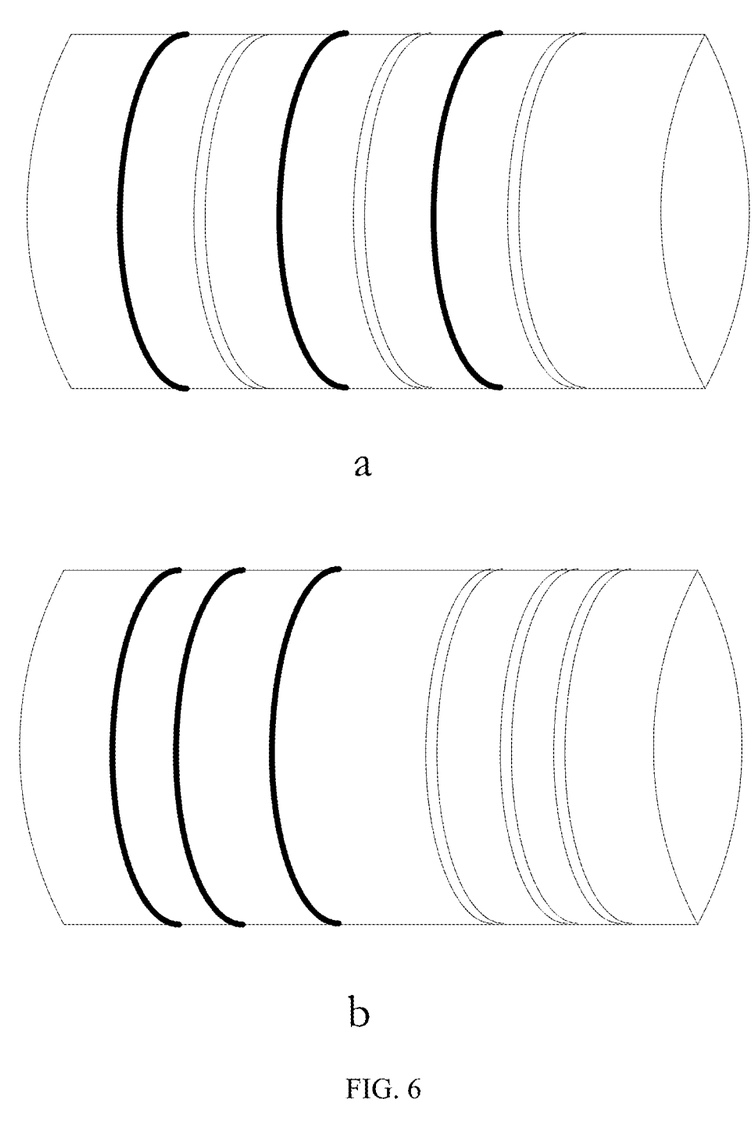
FIG. 6 is a schematic diagram of an excitation coil and an induction coil according to an embodiment of the present disclosure.

In the embodiment of the present disclosure, the excitation coil 2 and/or the induction coil 7 are wound around an outer side of the hollow cylindrical support 9, or the excitation coil 2 and/or the induction coil 7 are provided on an inner wall of the hollow cylindrical support 9.

As shown in FIG. 6, the excitation coil 2 and/or the induction coil 7 are wound around the outer side of the hollow cylindrical support 9.

In the embodiment of the present disclosure, the induction coil 7 and the excitation coil 2 are wound alternately; or the induction coil 7 and the excitation coil 2 are wound separately; or the induction coil 7 is wound outside the excitation coil 2; or the excitation coil 2 is wound outside the induction coil 7.

As shown in FIG. 6, the black curve is the excitation coil 2, and the hollow curve is the induction coil 7; or the black curve is the induction coil 7, and the hollow coil is the excitation coil 2.

In the embodiment of the present disclosure, the winding alternately means one turn of the excitation coil 2 and one turn of the induction coil 7, as shown in FIG. 6 (a); or any turn of the excitation coil 2, any turn of the induction coil 7, and then any turn of the excitation coil 2; or any turn of the induction coil 7, any turn of the excitation coil 2, and then any turn of the induction coil 7, etc., which will not be repeated here.

The winding separately means winding the excitation coil 2 and then winding the induction coil 7, or winding the induction coil 7 and then winding the excitation coil 2, as shown in FIG. 6 (*b*).

In the embodiment of the present disclosure, the induction coil 7 is wound outside the excitation coil 2, or the excitation coil 2 is wound outside the induction coil 7.

In the embodiment of the present disclosure, the induction coil 7 may be wound around the outer side of the hollow cylindrical support 9, and the excitation coil 2 is provided on the inner wall of the hollow cylindrical support 9. Alternatively, the induction coil 7 may be provided on the inner wall of the hollow cylindrical support 9, and the excitation coil 2 is wound around the outer side of the hollow cylindrical support 9.

In the embodiment of the present disclosure, the induction coil 7 and the excitation coil 2 may be wound in other manners, which will not be repeated here.

Relative positions of the excitation coil 2 and the induction coil 7 are only illustratively described in FIG. 6, and in practical application, the two coils may be tightly wound instead of being sparsely wound as shown in FIG. 6.

In the embodiment of the present disclosure, there is a gap between the excitation coil 2 and the amorphous strip detection strip 1. There is a gap between the induction coil 7 and the amorphous strip detection strip 1. That is, regardless of how the excitation coil 2 and the induction coil 7 are wound, the excitation coil 2 and the amorphous strip detection strip 1 are not in contact, and the induction coil 7 and the amorphous strip detection strip 1 are also not in contact.

The torque detection method for a robot joint servo motor of the embodiment of the present disclosure includes the following steps.

The amorphous strip detection strip 1 generates the magnetic induction intensity change according to a torque change of the output shaft 8.

The magnetic induction intensity change is used for the excitation coil 2 to generate the changing magnetic field.

The changing magnetic field is used for the induction coil 7 to generate the changing current.

The changing current is used for the controller 3 to acquire the value of the torque.

Figure 7:
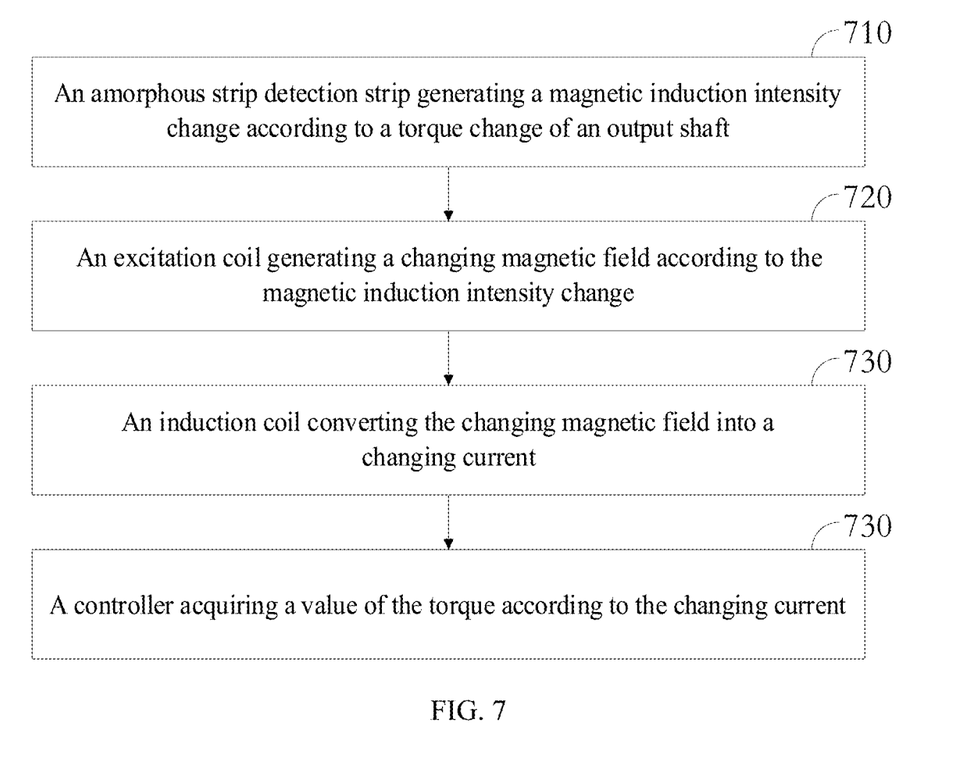
FIG. 7 is a flowchart of a torque detection method for a robot joint servo motor according to an embodiment of the present disclosure.

FIG. 7 is a flowchart of a torque detection method for a robot joint servo motor according to an embodiment of the present disclosure. As shown in FIG. 7, the torque detection method for a robot joint servo motor of the embodiment of the present disclosure includes the following steps.

At step 710, the amorphous strip detection strip 1 generates the magnetic induction intensity change according to the torque change of the output shaft 8.

At step 720, the excitation coil 2 generates the changing magnetic field according to the magnetic induction intensity change.

At step 730, the induction coil 7 converts the changing magnetic field into the changing current.

At step 740, the controller 3 acquires the value of the torque according to the changing current.

FIG. 7 is a flowchart of a torque detection method for a robot joint servo motor 4 in one embodiment. It should be understood that, although steps in the flowchart of FIG. 7 are shown sequentially as indicated by the arrows, these steps are not necessarily performed sequentially in the order indicated by the arrows. These steps are performed in no strict order unless explicitly stated herein, and may be performed in other orders. Moreover, at least a part of the steps in FIG. 7 may include a plurality of sub-steps or stages that are not necessarily performed at the same time, but may be performed at different times. The order in which these sub-steps or stages are performed is not necessarily sequential, but may be performed in turn or in alternation with other steps or at least a part of the sub-steps or stages of other steps.

Figure 8:
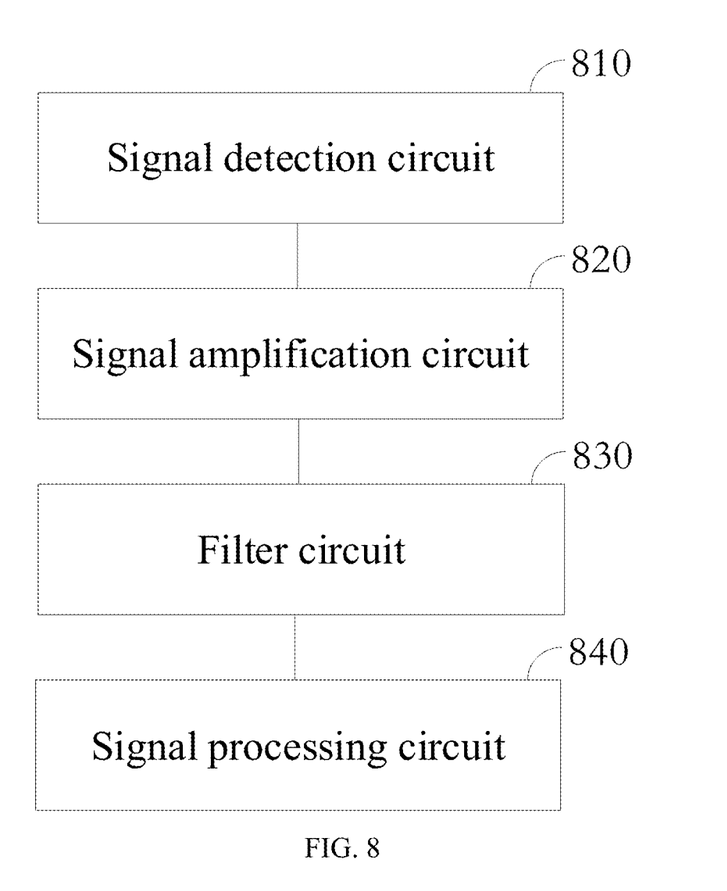
FIG. 8 is a schematic structural diagram of a controller according to an embodiment of the present disclosure.

As shown in FIG. 8, the controller 3 includes a signal detection circuit 810, a signal amplification circuit 820, a filter circuit 830, and a signal processing circuit 840.

Before the amorphous strip detection strip 1 generating the magnetic induction intensity change according to a torque change of the output shaft 8, the method further includes the following steps.

The signal detection circuit 810 generates a high-frequency excitation electrical signal and transmits the high-frequency excitation electrical signal to the excitation coil 2.

The changing current being used for the controller 3 to acquire the value of the torque includes the following steps.

The signal detection circuit 810 receives the changing current outputted by the induction coil 7.

The signal amplification circuit 820 amplifies the changing current and outputs an amplified changing current.

The filter circuit 830 filters out clutters in the amplified changing current and outputs a filtered changing current.

The signal processing circuit 840 acquires the value of the torque according to the filtered changing current.

In the embodiment of the present disclosure, the signal processing circuit 840 acquiring the value of the torque according to the filtered changing current includes the following steps.

The signal processing circuit 840 acquires a first current at a first moment.

The signal processing circuit 840 acquires a second current at a second moment.

The signal processing circuit 840 acquires a difference between the first current and the second current.

The signal processing circuit 840 acquires the value of the torque from the first moment to the second moment according to the difference and a parameter of the amorphous strip detection strip 1.

In the embodiment of the present disclosure, the signal amplification circuit 820, the filter circuit 830, and the signal processing circuit 840 may be provided on the hollow cylindrical support 9 or other positions of the servo motor 4.

The signal processing circuit 840 acquires the value of the torque from the first moment to the second moment according to the difference and the parameter of the amorphous strip detection strip 1, which may be calculated according to an equation. In practical application, the value of the torque may also be directly acquired through a calibration table after calibration according to a test. In other embodiments of the present disclosure, the value of the torque may also be acquired through a trained neural network model, etc. In other embodiments of the present disclosure, it may also be acquired in other ways and will not be repeated here.

In the embodiment of the present disclosure, the amorphous strip detection strip 1 is adhered to the output shaft 8 so that the amount of torque on the output shaft 8 may detected with high accuracy and low cost.

The present disclosure also provides a torque detection apparatus for a robot joint servo motor 4, where the detection apparatus is applied to a harmonic reducer 5 of the servo motor 4; the harmonic reducer 5 includes an output shaft 8 and a hollow cylindrical support 9, and the output shaft 8 is provided inside the hollow cylindrical support 9; the detection apparatus includes:

an amorphous strip detection strip 1 provided on the output shaft 8 and configured to generate a magnetic induction intensity change according to a torque change of the output shaft 8;

an excitation coil 2 provided on the hollow cylindrical support 9 and configured to generate a changing magnetic field according to the magnetic induction intensity change;

an induction coil 7 provided on the hollow cylindrical support 9 and configured to convert the changing magnetic field into a changing current; and a controller 3 configured to acquire a value of the torque according to the changing current.

The embodiment of the present disclosure also provides a robot joint servo motor 4, applied to the above-mentioned torque detection method for a robot joint servo motor 4.

In the embodiment of the present disclosure, the amorphous strip detection strip 1 is adhered to the output shaft 8 so that the amount of torque on the output shaft 8 may detected with high accuracy and low cost.

The embodiment of the present disclosure also provides a computer device, including a memory, a processor, and a computer program stored on the memory and capable of running on the processor. The processor, when executing the computer program, implements the following method: the amorphous strip detection strip generating the magnetic induction intensity change according to the torque change of the output shaft, where the magnetic induction intensity change is used for the excitation coil to generate the changing magnetic field; the changing magnetic field is used for the induction coil to generate the changing current; the changing current is used for the controller to acquire the value of the torque.

The embodiment of the present disclosure also provides a computer-readable storage medium having stored thereon a computer program. The computer program, when executed by a processor, implements the following method: the amorphous strip detection strip generating the magnetic induction intensity change according to the torque change of the output shaft, where the magnetic induction intensity change is used for the excitation coil to generate the changing magnetic field; the changing magnetic field is used for the induction coil to generate the changing current; the changing current is used for the controller to acquire the value of the torque.

The above-mentioned torque detection method for a robot joint servo motor achieves the beneficial effect of being able to solve the technical problem proposed in the background.

Figure 9:
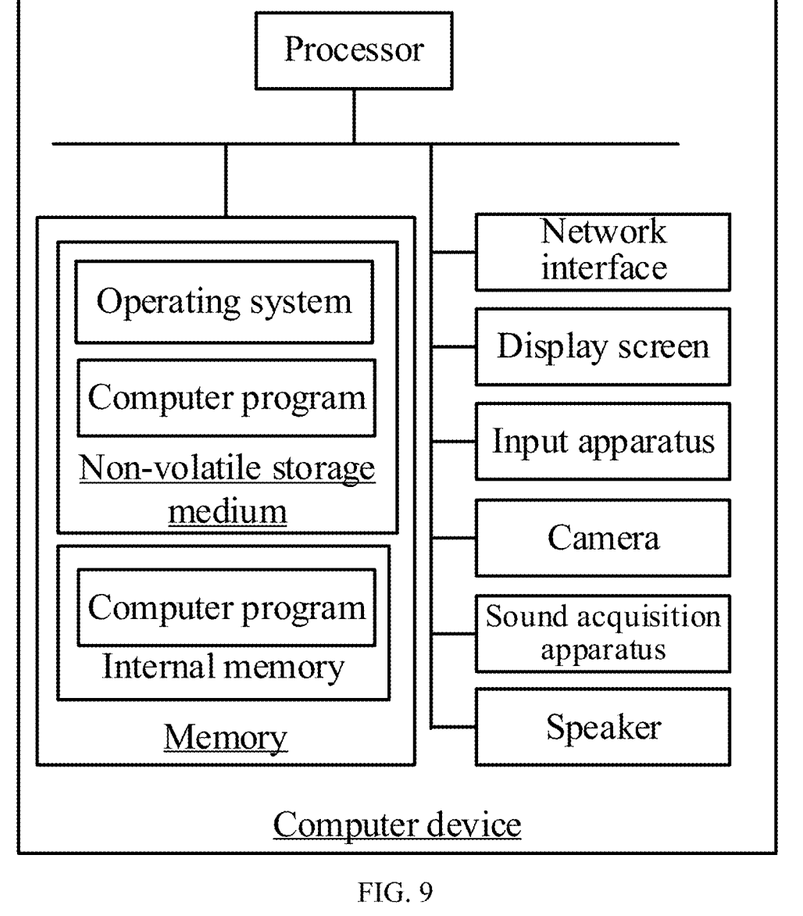
FIG. 9 is an internal structure diagram of a computer device according to an embodiment of the present disclosure.

FIG. 9 shows an internal structure diagram of a computer device in one embodiment. The computer device may specifically be the server 120 in FIG. 1. As shown in FIG. 9, the computer device includes a processor, a memory, a network interface, an input apparatus, and a display screen connected through a system bus. The memory includes a non-volatile storage medium and an internal memory. The non-volatile storage medium of the computer device stores an operating system and may also store a computer program which, when executed by the processor, may cause the processor to implement the torque detection method for a robot joint servo motor. The internal memory may also store a computer program which, when executed by the processor, may cause the processor to implement the torque detection method for a robot joint servo motor. The display screen of the computer device may be a liquid crystal display screen or an electronic ink display screen. The input apparatus of the computer device may be a touch layer covered on the display screen, may be a key, a trackball, or a touch pad provided on the housing of the computer device, and may also be an external keyboard, touch pad, or mouse.

It will be appreciated by a person skilled in the art that the structure shown in FIG. 9 is merely a block diagram of some of the structures associated with the solution of the present disclosure and does not constitute a limitation on the computer device to which the solution of the present disclosure is applied. Specifically, the computer device may include more or fewer components than those shown in the drawings, may combine certain components, or may have different arrangements of components.

It will be appreciated by a person skilled in the art that implementing all or part of the flows of the method in the above-mentioned embodiments may be accomplished by instructing the relevant hardware through the computer program. The program may be stored on one non-volatile computer-readable storage medium, and which when executed may include the flows of the embodiments of the methods described above. Any references to memory, storage, databases, or other media used in embodiments provided by the present disclosure may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache memory. As an illustration and not limitation, the RAM are available in many forms such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM), a rambus direct RAM (RDRAM), a direct memory bus dynamic RAM (DRDRAM), and a memory bus dynamic RAM (RDRAM).

It is noted that relational terms herein such as "first" and "second" may be used merely to distinguish one entity or operation from another entity or operation without necessarily requiring or implying any actual such relationship or order between these entities or operations. Furthermore, the terms "comprise", "contain", or any other variation thereof is intended to cover a non-exclusive inclusion such that a process, method, article, or device that includes a list of elements does not include only those elements but may include other elements not expressly listed or inherent to this process, method, article, or device. An element defined by the phrase "comprises a . . . " does not, without more constraints, preclude the existence of additional identical elements in the process, method, article, or device that includes the elements.

The foregoing are only specific implementations of the present disclosure to enable a person skilled in the art to understand or realize the present disclosure. Various modifications to these embodiments will be apparent to a person skilled in the art, and the general principles defined herein may be realized in other embodiments without departing from the spirit or scope of the present disclosure. Therefore, the present disclosure will not be limited to these embodiments shown herein but shall conform to the widest scope consistent with the principles and novel features applied herein.

What is claimed is:

1. A torque detection method for a robot joint servo motor, wherein the servo motor comprises a harmonic reducer and a detection apparatus; the harmonic reducer comprises an output shaft and a hollow cylindrical support, and the output shaft is provided inside the hollow cylindrical support;

the detection apparatus comprises: a controller, an amorphous strip detection strip provided on the output shaft, and an excitation coil and an induction coil provided on the hollow cylindrical support;

the method comprises:

the amorphous strip detection strip generating a magnetic induction intensity change according to a torque change of the output shaft, wherein the magnetic induction intensity change is used for the excitation coil to generate a changing magnetic field;

the changing magnetic field is used for the induction coil to generate a changing current;

the changing current is used for the controller to acquire a value of the torque.

2. The method according to claim 1, wherein the amorphous strip detection strip is adhered to the output shaft of the harmonic reducer and surrounds the output shaft in a circle.

3. The method according to claim 1, wherein the amorphous strip detection strip comprises notches configured to amplify the magnetic induction intensity change.

4. The method according to claim 1, wherein any plane passing through an axis of the output shaft is taken as a projection plane, the axis of the output shaft is taken as an X-axis, and a line perpendicular to the X-axis in the projection plane is taken as a Y-axis;

the amorphous strip detection strip comprises a first pattern and a second pattern; the first pattern comprises a plurality of first notches, and the second pattern comprises a plurality of second notches;

a projection of the first notch on the projection plane is a first projection, and a plurality of first projections are parallel;

an angle of an included angle between each of the first projections and the X-axis is a first angle, and a plurality of first angles are equal;

a projection of the second notch on the projection plane is a second projection, and a plurality of second projections are parallel;

an angle of an included angle between each of the second projections and the X-axis is a second angle, and a plurality of second angles are equal, wherein the first angle is not equal to the second angle.

5. The method according to claim 4, wherein the output shaft comprises a first end;

a first length is a distance between a projection point of any point on any one of the first notches on the projection plane and the first end;

a second length is a distance between a projection point of any point on any one of the second notches on the projection plane and the first end, wherein the first length is less than the second length.

6. The method according to claim 4, wherein a sum of the first angle and the second angle is 180 degrees.

7. The method according to claim 6, wherein the first angle is 45 degrees, or the second angle is 45 degrees.

8. The method according to claim 4, wherein an angle of an included angle between a stress direction of the output shaft and the X-axis is a stress angle;

the first angle is equal to the stress angle; or the second angle is equal to the stress angle.

9. The method according to claim 1, wherein the excitation coil and/or the induction coil are wound around an outer wall of the hollow cylindrical support; or the excitation coil and/or the induction coil are provided on an inner wall of the hollow cylindrical support.

10. The method according to claim 9, wherein the induction coil and the excitation coil are wound alternately; or the induction coil and the excitation coil are wound separately; or the induction coil is wound outside the excitation coil; or the excitation coil is wound outside the induction coil.

11. The method according to claim 1, wherein the controller comprises a signal detection circuit, a signal amplification circuit, a filter circuit, and a signal processing circuit;

before the amorphous strip detection strip generating a magnetic induction intensity change according to a torque change of the output shaft, the method further comprises:

the signal detection circuit generating a high-frequency excitation electrical signal and transmitting the high-frequency excitation electrical signal to the excitation coil;

the changing current being used for the controller to acquire a value of the torque comprises:

the signal detection circuit receiving the changing current outputted by the induction coil;

the signal amplification circuit amplifying the changing current and outputting an amplified changing current;

the filter circuit filtering out clutters in the amplified changing current and outputting a filtered changing current; and the signal processing circuit acquiring the value of the torque according to the filtered changing current.

12. The method according to claim 11, wherein the signal processing circuit acquiring the value of the torque according to the filtered changing current comprises:

the signal processing circuit acquiring a first current at a first moment;

the signal processing circuit acquiring a second current at a second moment;

the signal processing circuit acquiring a difference between the first current and the second current; and the signal processing circuit acquiring the value of the torque from the first moment to the second moment according to the difference and a parameter of the amorphous strip detection strip.

13. A torque detection apparatus for a robot joint servo motor, wherein the detection apparatus is applied to a harmonic reducer of the servo motor; the harmonic reducer comprises an output shaft and a hollow cylindrical support, and the output shaft is provided inside the hollow cylindrical support; the detection apparatus comprises:

an amorphous strip detection strip provided on the output shaft and configured to generate a magnetic induction intensity change according to a torque change of the output shaft;

an excitation coil provided on the hollow cylindrical support and configured to generate a changing magnetic field according to the magnetic induction intensity change;

an induction coil provided on the hollow cylindrical support and configured to convert the changing magnetic field into a changing current; and a controller configured to acquire a value of the torque according to the changing current.

14. A robot joint servo motor, applied to the torque detection method for a robot joint servo motor according to claim 1.

15. A computer device, comprising a memory, a processor, and a computer program stored on the memory and capable of running on the processor; the processor, when executing the computer program, implementing the method according to claim 1.

16. A computer-readable storage medium having stored thereon a computer program, the computer program, when executed by a processor, implementing the method according to claim 1.

* * * * *